United States Patent
Takechi

(10) Patent No.: US 9,911,978 B2
(45) Date of Patent: Mar. 6, 2018

(54) ORGANIC ACTIVE MATERIALS FOR RECHARGEABLE BATTERY

(71) Applicant: Toyota Motor Engineering & Manufacturing North America, Inc., Erlanger, KY (US)

(72) Inventor: Kensuke Takechi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 108 days.

(21) Appl. No.: 14/719,410

(22) Filed: May 22, 2015

(65) Prior Publication Data

US 2016/0344031 A1    Nov. 24, 2016

(51) Int. Cl.
*H01M 4/36* (2006.01)
*H01M 4/60* (2006.01)
*H01M 8/18* (2006.01)
*H01M 8/20* (2006.01)
*H01M 8/22* (2006.01)
*H01M 10/052* (2010.01)

(52) U.S. Cl.
CPC ............. *H01M 4/60* (2013.01); *H01M 8/188* (2013.01); *H01M 8/20* (2013.01); *H01M 8/222* (2013.01); *H01M 10/052* (2013.01); *Y02E 60/528* (2013.01)

(58) Field of Classification Search
CPC .......... H01M 4/60; H01M 8/188; H01M 8/20; H01M 8/222; H01M 10/052
See application file for complete search history.

(56) References Cited

U.S. PATENT DOCUMENTS

| | | | |
|---|---|---|---|
| 2014/0141291 A1* | 5/2014 | Wang | H01M 4/13 429/51 |
| 2014/0178735 A1 | 6/2014 | Wang et al. | |
| 2015/0263371 A1* | 9/2015 | Stahl | H01M 8/188 429/498 |

OTHER PUBLICATIONS

Doi et al.; "Development of an Azanoradamantane-Type Nitroxyl Radical Catalyst for Class-Selective Oxidation of Alcohols"; The Journal of Organic Chemistry; Published Oct. 22, 2014; pp. 401-413, in 14 pages.
Nishide et al.; "Organic Radical Battery"; The Electrochemical Society Interface; Winter, 2005; pp. 32-36, in 5 pages.
Takechi; "Quinone-Based High Energy Density Liquid Active Material for Flow Battery"; U.S. Appl. No. 14/590,962, filed Jan. 6, 2015.

* cited by examiner

*Primary Examiner* — Jimmy Vo
(74) *Attorney, Agent, or Firm* — Christopher G. Darrow; Darrow Mustafa P.C.

(57) ABSTRACT

An organic active material, having good energy density and electrochemical stability, for use in an electrochemical cell is disclosed. Electrochemical cells that employ the organic active material are also disclosed. The organic active material is a bridged-ring organic molecule having a nitroxy moiety, the nitroxy moiety being capable of two-electron oxidation/reduction through three distinct redox states. In different implementations, the organic active material can be incorporated in a solid electrode or can be employed as a fluid active material such as is useful for a flow cell. In different variations, the organic active material can be employed as a cathodic active material or as an anodic active material.

8 Claims, 4 Drawing Sheets

ORGANIC ACTIVE MATERIALS FOR RECHARGEABLE BATTERY

TECHNICAL FIELD

The present invention relates in general to an organic active material for use in a conventional battery or flow battery, and to a battery employing the organic active material.

BACKGROUND

Electrochemical cells, such as batteries, typically employ electrochemical active materials (species that undergo electrochemical oxidation and/or reduction during cell operation) that are inorganic. Common examples include metal/metal cation systems, such as $Li/Li^+$, as well as complex inorganic ions that can intercalate into an electrode upon oxidation or reduction.

Organic active materials are attractive because they are generally lightweight, relatively inexpensive, and amenable to chemical modification/design in order to develop properties suitable for a particular application. However, it has often proven difficult to design organic active materials that have appropriate redox potential, high stability over the course of multiple charge/discharge cycles (in the case of a secondary battery), and other necessary properties.

In addition, organic active materials typically have relatively low energy density (equivalents of charge transfer capability per unit mass or volume) in comparison to inorganic active materials. This is due to the normally large molecular size of organic active materials. One strategy to offset this drawback is to design organic active materials in which the molecule is able to undergo a two-electron (or other multi-electron) reduction/oxidation.

Flow cells or flow batteries are electrochemical cells that do not have solid electrodes but instead have liquid active materials: electrochemical active materials that are liquid in both (or all) reduced and oxidized states. Because there are no solid electrodes to be regenerated via charging, a flow battery can be recharged by draining the discharged liquid active material and refueling with charged liquid active material. This capability to be quickly recharged by refueling makes the use of flow batteries a potentially valuable approach to powering electrical systems that are in near constant use such that extended recharging times would be unacceptable, for example electrically powered municipal transportation vehicles.

However, because flow batteries lack a pool of reduced active material in the form of a solid anode and a sink for oxidized active material in the form of a solid cathode, they typically suffer from low energy density. This low energy density results in a need for frequent refueling and thus largely offsets the value derived from the capability of rapid recharging by refueling.

If a flow cell is to have an organic active material, it is thus particularly important that the organic active material be designed to have a higher than typical energy density.

SUMMARY

A liquid catholyte and an electrochemical cell employing the liquid catholyte is disclosed. An automotive vehicle employing an electrochemical cell of the present disclosure is likewise disclosed.

In one aspect, an electrochemical half-cell is provided, including an electrolyte and a solid electrode in contact with the electrolyte. The solid electrode contains an organic active material that includes a bridged-ring, organic molecule having a nitroxy moiety that is present as any of an aminoxy anion, a nitroxide radical, and an oxoammonium cation.

In another aspect, a flow half-cell is provided, including a current collector and a fluid active material in electrical communication with the current collector. The fluid active material includes a bridged-ring, organic molecule having a nitroxy moiety that is present as any of an aminoxy anion, a nitroxide radical, and an oxoammonium cation. The organic active material is fluid regardless of its redox state; and is configured to undergo reversible electrochemical reduction/oxidation between any redox state including aminoxy anion, nitroxide radical, and oxoammonium cation when the current collector of the flow half-cell is placed in electrical communication with a current collector of an opposing half-cell.

In another aspect, an electrochemical cell is provided. The electrochemical cell includes an anodic half-cell; a cathodic half-cell having a cathodic current collector and an electrolyte composition; and a semi-permeable separator disposed between the anodic half-cell and the cathodic half-cell. The electrolyte composition comprises a solvate-ionic liquid that includes a fluoroalkylsulfonyl salt and a bridged-ring, organic molecule having a nitroxy moiety.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

The present disclosure describes organic active materials for electrochemical cells, and cells containing such active materials. The organic active materials of the present disclosure support high coulombic efficiency and can support a two-electron equivalent redox transfer, yielding good energy density in comparison to other organic active materials. In addition, the organic active materials of the present disclosure can form solvate ionic liquids in combination with fluoroalkylsulfonyl salts, enabling their use as fluid active materials in either the anodic half-cell or cathodic half-cell of a flow-cell battery.

Organic active materials of the present disclosure include a bridged-ring organic molecule having a nitroxy moiety. The nitroxy moiety can be present in any of three redox states (fully reduced, intermediate, or fully oxidized), and is thus able to accept to or donate to equivalents of electrons during a complete reduction or oxidation, respectively. The bridged-ring structure substantially improves the stability of the otherwise unstable fully-reduced species, enabling the full range of coulombic efficiency and energy density. Combination of the organic active material with a fluoroalkylsulfonyl salt can form a solvate-ionic liquid, enabling use of the active material in a liquid catholyte for a flow-cell battery.

Accordingly, an organic active material for use in an electrochemical cell, including an electrochemical half-cell, is disclosed herein. The organic active material includes a bridged-ring organic molecule having a nitroxy moiety. As it is used herein, the term nitroxy moiety refers to a nitroxide radical. It will be appreciated that the nitroxide radical has two reversible redox pairs as shown in Scheme I:

Scheme I

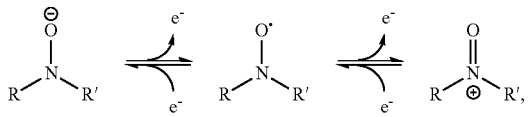

where R and R' together form the organic bridged-ring structure.

The nitroxide radical becomes an oxoammonium cation via one-electron oxidization, which can be reduced to reproduce the nitroxide radical. Further, the nitroxide radical becomes an aminooxy anion via one-electron reduction, which can be oxidized to reproduce the nitroxide radical. Accordingly, the phrase "nitroxy moiety" refers to any of the nitroxide radical, the aminoxy anion, and the oxoammonium cation.

Figure 1A:
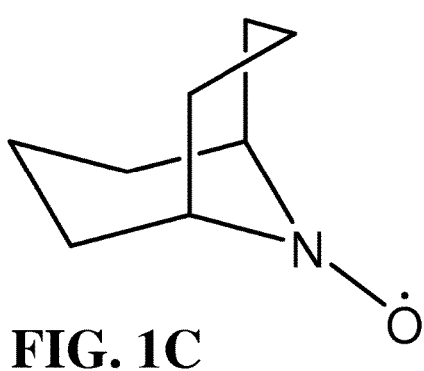
FIG. 1A is a line drawing of a first exemplary organic active material, 9-azabicyclo[3.3.1]nonane-N-oxyl (ABNO)
Figure 1B:
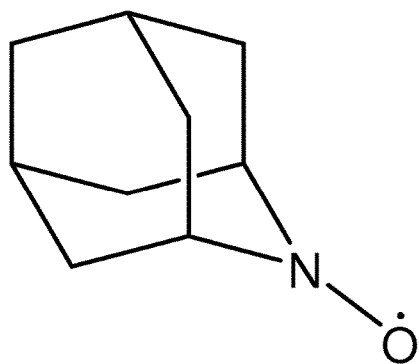
FIG. 1B is a line drawing of a second exemplary organic active material, 2-azaadamantane-N-oxyl (AZADO)
Figure 1C:
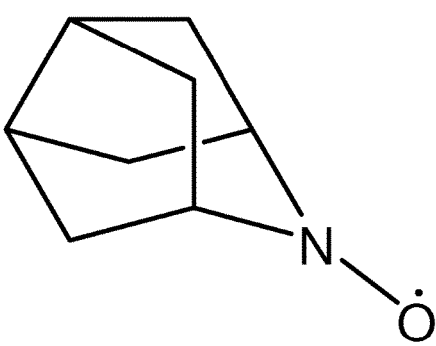
FIG. 1C is a line drawing of a third exemplary organic active material, 2-azanoradamantane-N-oxyl (nor-AZADO)

Suitable, non-limiting examples of a bridged-ring organic molecule having a nitroxy moiety include 9-azabicyclo [3.3.1]nonane-N-oxyl (ABNO), 2-azaadamantane-N-oxyl (AZADO), and 2-azanoradamantane-N-oxyl (nor-AZADO). Structures of ABNO, AZADO, and nor-AZADO are shown in FIGS. 1A-C, respectively.

Figure 2A:
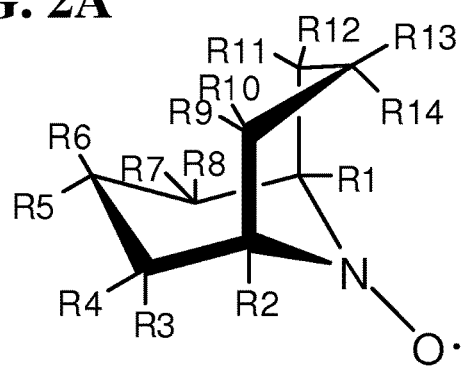
FIG. 2A is a wedged line drawing of optionally substituted ABNO.
Figure 2B:
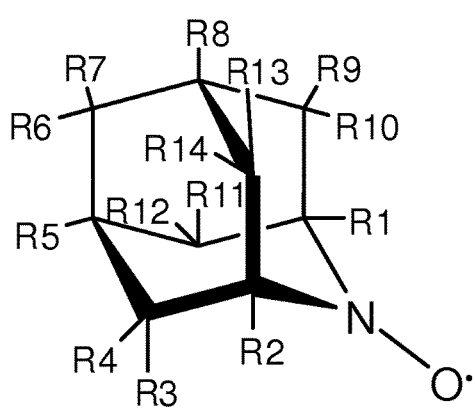
FIG. 2B is a wedged line drawing of optionally substituted AZADO.
Figure 2C:
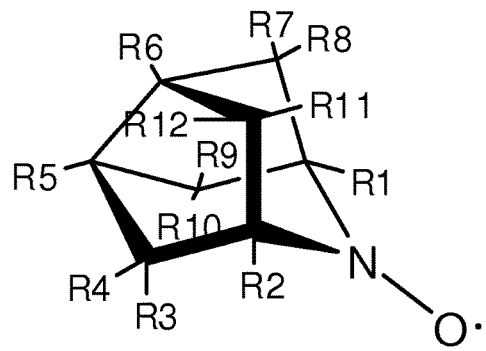
FIG. 2C is a wedged line drawing of optionally substituted nor-AZADO.

The bridged-ring organic molecule having a nitroxy moiety can be optionally substituted at any 2° or 3° carbon, as illustrated in FIGS. 2A-C. FIG. 2A shows an ABNO molecule in which each of R1-R14 is, independently, hydrogen, alkyl, or alkoxy; FIG. 2B shows an AZADO molecule in which each of R1-R14 is, independently, hydrogen, alkyl, or alkoxy; and FIG. 2C shows a nor-AZADO in which each of R1-R12 is independently hydrogen, alkyl, or alkoxy.

It is to be appreciated that, in different implementations, organic active materials of the present disclosure can be utilized in conjunction with any suitable carrier ion, including but not limited to: Li-ion, Mg-ion, and Na-ion. It should also be appreciated that the organic active materials of the present disclosure can be employed in conjunction with any suitable counter-ion(s). In some implementations, suitable counter-ions can include fluoroalkylsulfonyl anions, as discussed further below.

In some implementations, the organic active materials of the present disclosure can be employed in a solid phase electrode, in which the organic active material is affixed to an appropriate electrode substrate. For example, an organic active material can be affixed to a polymeric substrate to form an electrode having a solid-phase active material.

In other implementations, an organic active material can be employed as a fluid active material that is in a fully fluid form in all redox states. Such a fluid active material can be useful in a flow half-cell, enabling rapid refueling by physical removal of a discharged organic active material and its replacement with charged organic active material.

In implementations in which the organic active material is employed as a fluid active material, fluidity in all redox states can be achieved by dissolving the organic active material in an appropriate solvent. Alternatively, and in order to achieve greater energy density, fluidity of the organic active material in all redox states can be achieved by incorporating the organic active material into a solvate-ionic liquid. In some instances, a solvate ionic liquid having the organic active material can be formed by combining the organic active material with a fluoroalkylsulfonyl anion. Suitable examples of such fluoroalkylsulfonyl anions include bis(trifluoromethylsulfonyl)imide (TFSI) and bis (pentafluoroethylsulfonyl)imide (BETI).

For example, a solvate-ionic liquid can be formed by melting an organic active material and a metal fluoroalkylsulfonyl salt, combining the molten organic active material and metal fluoroalkylsulfonyl salt, and then quickly cooling the combination to below the melting temperatures of the components. This results in a fluidized catholyte or anolyte composition having the organic active material and a supporting salt derived from the metal fluoroalkylsulfonyl salt. Examples of the latter can include salts of any desired carrier ion (e.g. Li⁺, Na⁺, Mg²⁺) with TFSI, BETI or trifluoromethylsulfonate.

In some implementations in which the organic active material is incorporated in a solvate-ionic liquid, a liquid fluidizer can be incorporated in the fluid active material. As used herein, the expression "liquid fluidizer" refers to a material that is liquid under standard conditions of temperature and pressure that, when present, can reduce viscosity of the solvate-ionic liquid. Non-limiting examples of suitable liquid fluidizer can include water, acetonitrile, and liquid organic molecules having a carbonate moiety, such as a substituted propionate. In some implementations, the liquid fluidizer can be present at a molar ratio relative to fluoroalkylsulfonyl salt of less than 20:1. In some implementations, the liquid fluidizer can be present within a range of 0-10% (v/v) of solvate-ionic liquid. Without being bound to any particular theory, while the phrase "liquid fluidizer" as used herein is largely similar to the term "solvent", it is not believed that a liquid fluidizer, when included in the solvate-ionic liquid, functions as a solvent because it is in many instances present at insufficiently high concentration to solvate other components of the solvate-ionic liquid.

Figure 3:
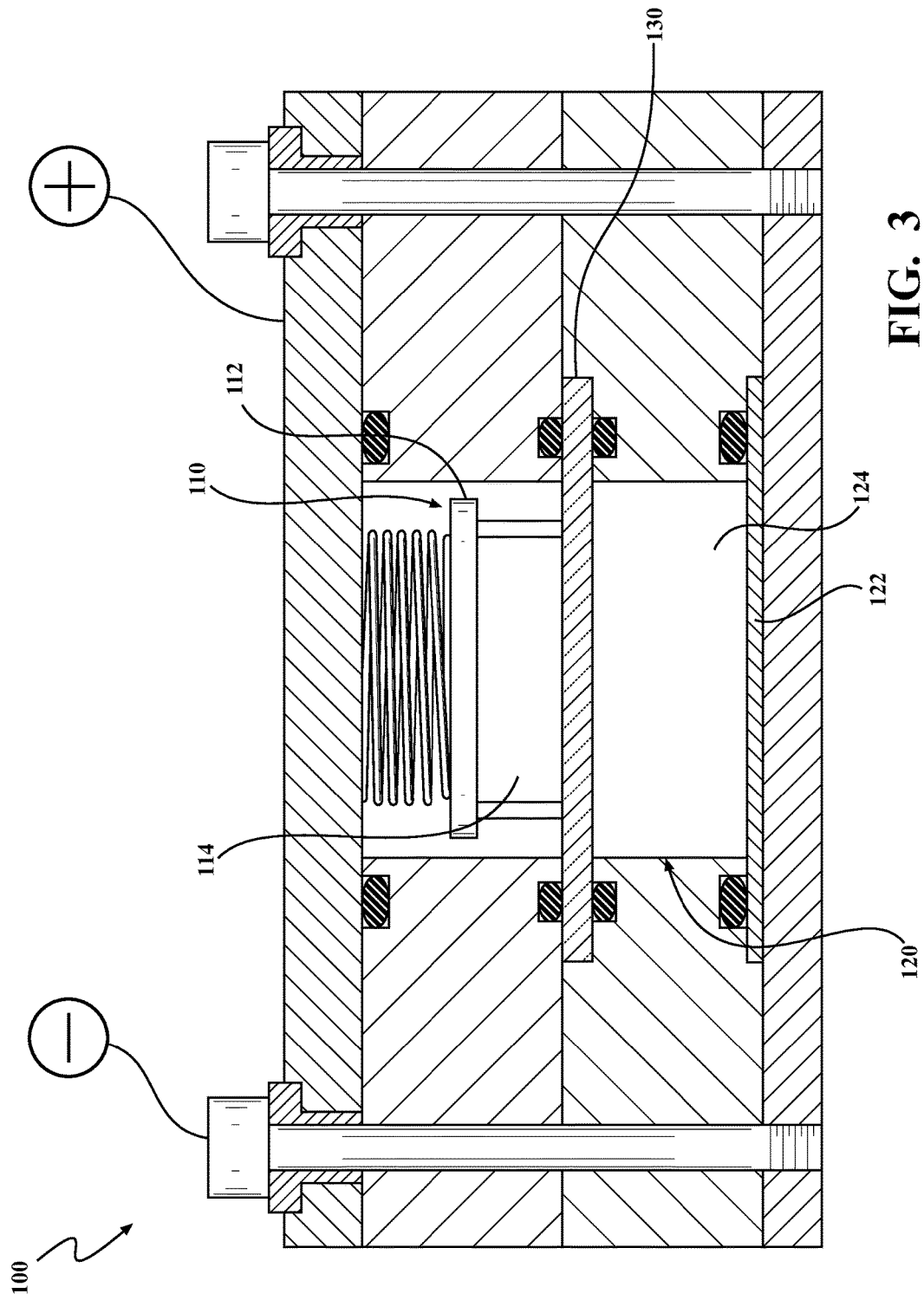
FIG. 3 is a schematic view of an electrochemical cell having an anodic half-cell and a cathodic half-cell, the cathodic half-cell including an organic active material of the present invention.

Additionally disclosed, and as illustrated in FIG. 3, is an electrochemical cell 100. The electrochemical cell includes two half-cells 110, 120. The two half-cells 110, 120 can be referred to as opposing half-cells, and one can be referred to as a cathodic half cell 110 and another as an anodic half cell 120. Each of the two half-cells 110, 120 has an electrolytic composition in contact with a current collector. The electrochemical cell is rendered operable for discharge when the current collector of the anodic half-cell is placed in electrical communication with the current collector of the cathodic half-cell, in which case an active material resident in the anodic half-cell can undergo electrochemical oxidation and an electrochemical active material resident in the cathodic half-cell can undergo electrochemical reduction, creating a current-carrying circuit between the two half-cells 110, 120. In general, at least one of the cathodic half-cell 110 and the anodic half-cell 120 will have an active material that includes the organic active material described above (i.e. a bridged-ring organic molecule having a nitroxy moiety).

Either half-cell 110, 120 can optionally have a solid electrode. A solid electrode is one in which the active material, in at least one of its redox states, is affixed directly or indirectly to the current collector and is therefore incapable of diffusion. In other variations, either half-cell 110, 120 can have a fluid active material that, in all of its redox states, is not affixed directly or indirectly to the current collector and is capable of diffusion. A half-cell that has a fluid active material can be referred to as a "flow half-cell".

In the exemplary electrochemical cell 100 of FIG. 3, the cathodic half-cell 110 is a flow half-cell having a fluid active material that includes a bridged-ring organic molecule with a nitroxy moiety. In particular examples of this cathodic half-cell 110, the electrolytic composition includes a solvate-ionic liquid, as described above, while the anode half-cell 120 is a standard Li/Li$^+$ half-cell. In the exemplary electrochemical cell 100 of FIG. 3, the anodic half-cell 120 and the cathodic half-cell 110 are in partial diffusional communication, being separated by a semi-permeable membrane 130 that permits cross-membrane diffusion of lithium ions and prevents cross-membrane diffusion of other species.

In different variations, a cathodic half-cell 110 can employ a solid electrode in which the organic active material is affixed directly or indirectly to the current conductor. In still other variations, an anodic half-cell 120 can employ the organic active material, as either a fluid active material or as part of a solid anode. That is to say, in different variations, the organic active material can be employed as either a cathodic active material or as an anodic active material and, as described above, as either a fluid or solid (including immobilized or affixed) active material. It is to be appreciated that the electrochemical cell 100 can comprise any type of electrochemical cell, including, but not limited to, a primary battery, a secondary battery, and a fuel cell.

Referring now to FIGS. 4-7, discharge-charge curves (following an initial charging) are shown for four variations of an electrochemical cell 100 of the present disclosure. While the details of construction of these examples are discussed in greater details in the Examples section below, each electrochemical cell for which data are shown in FIGS. 4-7 has an anodic half-cell 120 comprising a Li/Li$^+$ half-cell separated from the cathodic half-cell by a lithium-permeable membrane. Each example cathodic half-cell 110 includes a cathodic current collector 112 composed of carbon paper and 50 µL of a liquid catholyte 114 composed of a bridged-ring organic molecule of the present disclosure as active material, in combination with LiTFSI as a supporting salt and water as liquid fluidizer.

Figure 4:
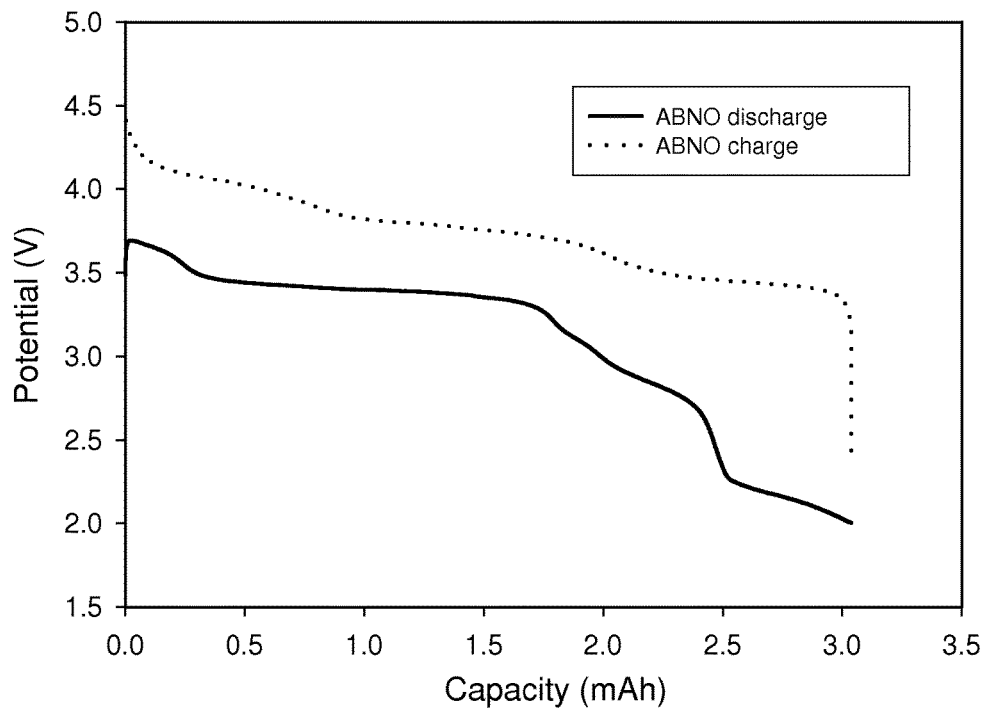
FIG. 4 is a graph of 1st cycle discharge-charge curves (after initial charge) of an example electrochemical cell of the type shown in FIG. 3, in which the anodic half-cell is $Li/Li^+$ and the cathodic half-cell includes 50 μL of ABNO:LiTFSI:$H_2O$ at a 1:1:6 molar ratio.

FIG. 4 shows discharge-charge data for a liquid catholyte having ABNO as the active material. As seen in the FIG. 2, the ABNO active material supports excellent rechargeability (Coulombic efficiency near 100% in this case), with appreciable capacity.

Figure 5:
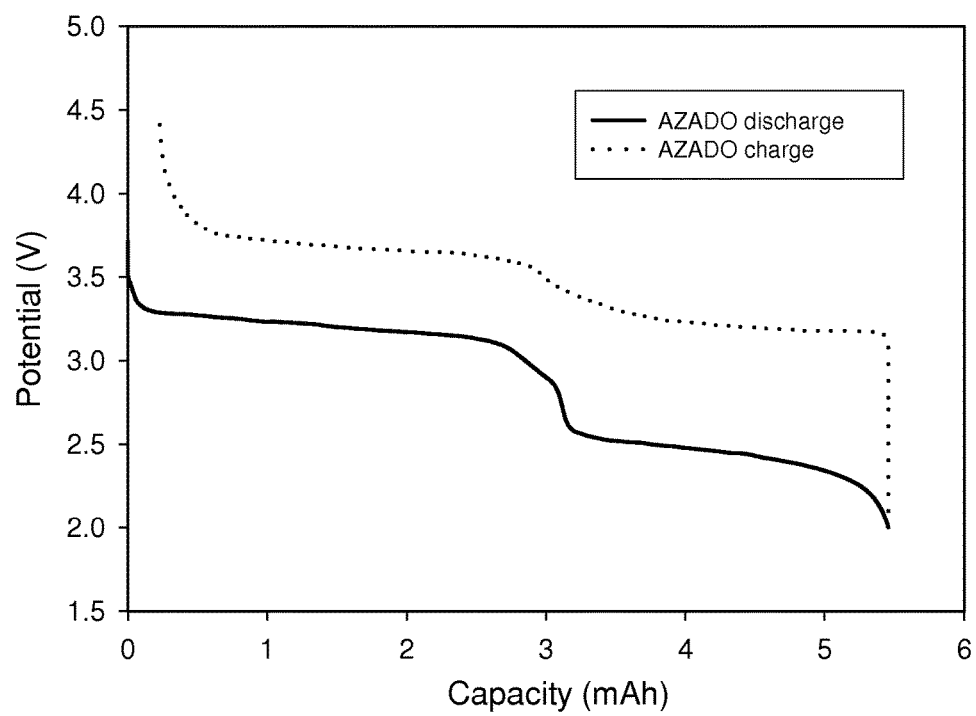
FIG. 5 is a graph of 1st cycle discharge-charge curves (after initial charge) of an example electrochemical cell of the type shown in FIG. 3, in which the anodic half-cell is $Li/Li^+$ and the cathodic half-cell includes 50 μL of AZADO:LiTFSI:$H_2O$ at a 1:1:6 molar ratio.
Figure 6:
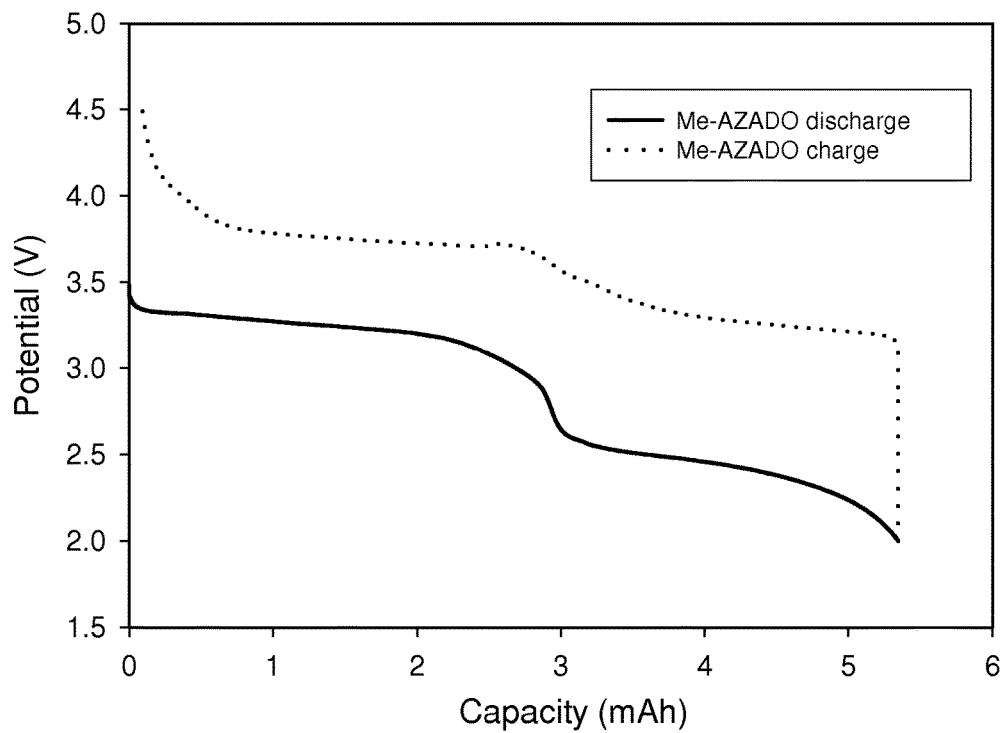
FIG. 6 is a graph of 1 st cycle discharge-charge curves (after initial charge) of an example electrochemical cell of the type shown in FIG. 3, in which the anodic half-cell is $Li/Li^+$ and the cathodic half-cell includes 50 μL of 1-methyl-2-azanoradamantane-N-oxyl:LiTFSI:$H_2O$ at a 1:1:6 molar ratio.
Figure 7:
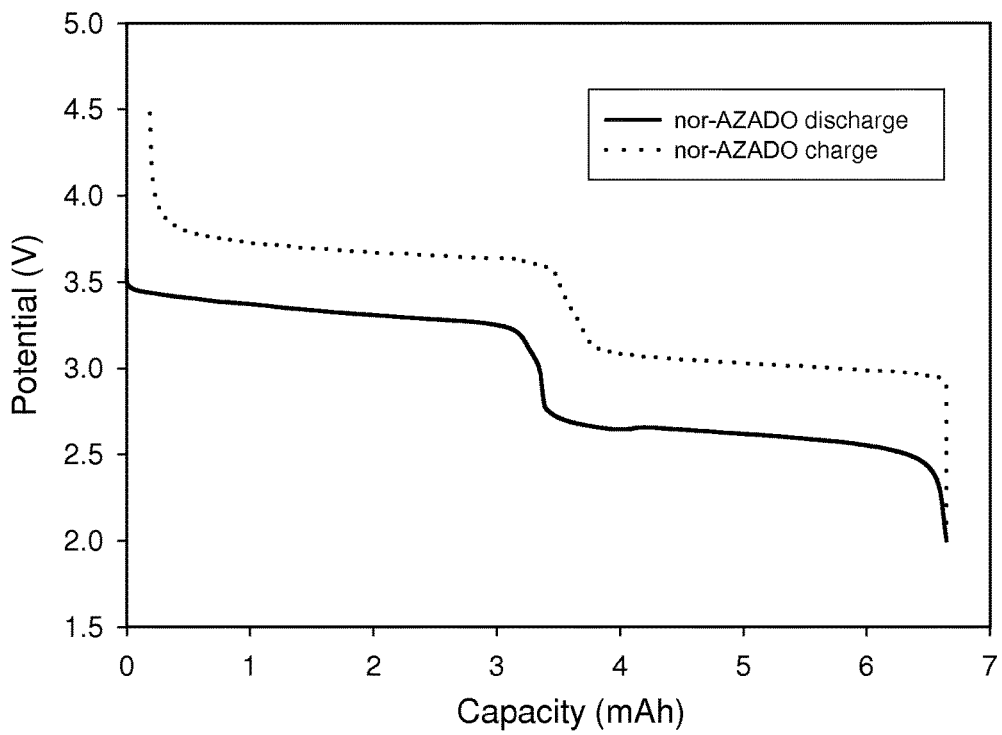
FIG. 7 is a graph of 1st cycle discharge-charge curves (after initial charge) of an example electrochemical cell of the type shown in FIG. 3, in which the anodic half-cell is Li/Li⁺ and the cathodic half-cell includes 50 μL of nor-AZADO:LiTFSI:H₂O at a 1:1:6 molar ratio.

FIG. 5 shows analogous discharge-charge curves for a cell having a flow cathode with AZADO as fluid cathode active material. The AZADO active material again shows excellent rechargeability supporting ~96% Coulombic efficiency in this case. The AZADO active material also supports improved capacity as compared to the ABNO active material, along with a more clearly defined two-electron redox profile. FIG. 6 shows the analogous discharge-charge profile for the electrochemical cell 100 having a fluidized catholyte with 1-methyl-AZADO (Me-AZADO) as organic active material. As compared to unsubstituted AZADO (FIG. 3), Me-AZADO has comparable Coulombic efficiency, with a marginally attenuated capacity within the examined electric potential window. FIG. 7 shows an analogous discharge-charge curve having nor-AZADO as organic active material in the cathodic half-cell. Of the four exemplary organic active materials shown, nor-AZADO (FIG. 7) demonstrates the strongest performance with good rechargeability, the highest energy density, and the most complete and clearly defined two-electron redox profile within the electric potential window.

The volumetric energy densities of the electrolytic compositions having ABNO, AZADO, Me-AZADO, and nor-AZADO are approximately 61, 109, 106, and 133 Ah·L$^{-1}$, respectively, under the test conditions. The relative performance of the four organic active materials shown can be qualitatively described as: ABNO<<Me-AZADO≤AZADO<nor-AZADO. It will be noticed that this trend is in agreement with a possible positive correlation between electrochemical performance of the organic active material and conformational constraint imposed by the bridged-ring structure. Without being bound to any particular theory, it is believed that a high degree of constraint imposed by the bridged-ring structure may improve stability of the organic active material, for example by increasing intramolecular distances between the nitroxide oxygen and adjacent aliphatic regions. To this possibility, it is noted that aminoxy anions in non-bridged-ring structures have been found to be fairly unstable.

In all cases, the capacity of the electrochemical cell 100 benefits from the substantially high concentration of the redox active material. For example, the nor-AZADO active material of the electrochemical cell of FIG. 5 is present at a concentration of 2.7 M. The other exemplary electrochemical cells tested have active material present at similar, but slightly different, concentration.

The present disclosure is further illustrated with respect to the following examples. It is to be understood that these examples are provided to illustrate specific illustrations of the present disclosure and should not be construed as presenting limits on the scope of the present disclosure.

EXAMPLES 1-4

The following examples are of electrochemical cells 100 of the present disclosure. In each example, the anodic half-cell 120 includes a 0.25 mm lithium metal anode 122 in contact with a dissolved electrolyte 124 consisting of 1 M LiTFSI in propylene carbonate. The cathodic half-cell 110 includes a cathodic current collector 112 composed of carbon paper and in contact with 50 µL of a composition containing a 1:1:6 molar ratio of bridged-ring organic molecule:LiTFSI:H$_2$O. The bridged-ring organic molecules of Examples 1-4 are ABNO, AZADO, Me-AZADO, and nor-AZADO, respectively. The cathodic half-cell 110 and anodic half-cell 120 are separated by a 1 mm thick LATP-based solid state Li-ion conductor (OHARA glass). Discharge-charge cycles for each Example electrochemical cell are monitored at 25° C. and at current density of 0.05 mA·cm$^2$. In every Example, the electrochemical cell 100 is charged prior to monitoring a single discharge-charge cycle across an electric potential window of 2.0 to 4.5 V.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A flow half-cell comprising:
   a current collector; and
   an electrolyte composition in electrical communication with the current collector, the electrolyte composition comprising a solvate ionic liquid consisting of:
      a metal cation;
      a fluoroalkylsulfonyl anion; and
      a bridged-ring organic molecule having a nitroxy moiety, the bridged-ring organic molecule selected from the group consisting of:
         a substituted or unsubstituted AZADO; and
         a substituted or unsubstituted nor-AZADO,
   wherein the solvate ionic liquid is fluid regardless of the redox state of the bridged-ring organic molecule;
   wherein the bridged-ring organic molecule undergoes reversible electrochemical reduction/oxidation between any redox state including aminoxy anion, nitroxide radical, and oxoammonium cation when the current collector of the flow half-cell is placed in electrical communication with a current collector of an opposing half cell.

2. The flow half-cell as recited in claim 1, wherein the electrolyte composition further comprises a liquid fluidizer.

3. The flow half-cell of claim 2, wherein a volume percent of liquid fluidizer:solvate-ionic liquid is about 10% or less.

4. The flow half-cell of claim 2, wherein the liquid fluidizer comprises water.

5. An electrochemical cell comprising:
   an anodic half-cell;
   a cathodic half-cell having:
      a cathodic current collector; and
      an electrolyte composition, comprising a solvate ionic liquid consisting of:
         a metal cation;
         a fluoroalkylsulfonyl anion; and
         a bridged-ring organic molecule having a nitroxy moiety, the bridged-ring organic molecule selected from the group consisting of:
            a substituted or unsubstituted AZADO; and
            a substituted or unsubstituted nor-AZADO; and
      a semi-permeable separator disposed between the anodic half-cell and the cathodic half cell.

6. The electrochemical cell of claim 5, wherein the fluoroalkylsulfonyl salt is selected from the group consisting of lithium bis(trifluoromethylsulfonyl)imide (LiTFSI), lithium bis(pentafluroethylsulfonyl)imide (LiBETI), lithium trifluoromethylsulfonate, sodium bis(trifluoromethylsulfonyl)imide (NaTFSI), magnesium bis(bis(trifluoromethylsulfonyl)imide (Mg(TFSI)$_2$), and a mixture thereof.

7. The electrochemical cell of claim 5, wherein the electrochemical cell is a flow cell and the anodic half-cell comprises a liquid anolyte having an anodic redox active material that is fluid regardless of oxidation state.

8. The electrochemical cell of claim 5, wherein the electrolyte composition consists essentially of the solvate ionic liquid.

* * * * *